US011909730B2

(12) United States Patent
Vijayasankar et al.

(10) Patent No.: US 11,909,730 B2
(45) Date of Patent: *Feb. 20, 2024

(54) AUTHENTICATION OF NETWORKED DEVICES HAVING LOW COMPUTATIONAL CAPACITY

(71) Applicant: TEXAS INSTRUMENTS INCORPORATED, Dallas, TX (US)

(72) Inventors: Kumaran Vijayasankar, Allen, TX (US); Oliver Shih, Pittsburgh, PA (US); Arvind K. Raghu, Dallas, TX (US); Ramanuja Vedantham, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,411

(22) Filed: Oct. 11, 2022

(65) Prior Publication Data

US 2023/0032116 A1     Feb. 2, 2023

Related U.S. Application Data

(63) Continuation of application No. 17/159,016, filed on Jan. 26, 2021, now Pat. No. 11,470,077, which is a (Continued)

(51) Int. Cl.
*H04L 9/40*     (2022.01)
*H04L 9/32*     (2006.01)

(52) U.S. Cl.
CPC ........ *H04L 63/0823* (2013.01); *H04L 9/3268* (2013.01); *H04L 63/0428* (2013.01);
(Continued)

(58) Field of Classification Search
CPC ............. H04L 63/0823; H04L 63/0884; H04L 63/062; H04L 63/0428; H04L 63/0435; H04L 63/0442; H04L 9/3268
See application file for complete search history.

(56) References Cited

U.S. PATENT DOCUMENTS 6,856,800 B1 *   2/2005   Henry ................. H04W 12/069
                                                                                                        455/410
7,159,016 B2     1/2007   Baker
(Continued)

OTHER PUBLICATIONS

Generalized Digital Certificate for User Authentication and Key Establishment for Secure Communications, by Harn et al., published Jul. 2011 (Year: 2011).*
(Continued)

*Primary Examiner* — Vu V Tran
(74) *Attorney, Agent, or Firm* — Mandy Barsilai Fernandez; Frank D. Cimino

(57) ABSTRACT

Authentication of a networked device with limited computational resources for secure communications over a network. Authentication of the device begins with the supplicant node transmitting a signed digital certificate with its authentication credentials to a proxy node. Upon verifying the certificate, the proxy node then authenticates the supplicant's credentials with an authentication server accessible over the network, acting as a proxy for the supplicant node. Typically, this verification includes decryption according to a public/private key scheme. Upon successful authentication, the authentication server creates a session key for the supplicant node and communicates it to the proxy node. The proxy node encrypts the session key with a symmetric key, and transmits the encrypted session key to the supplicant node which, after decryption, uses the session key for secure communications. In some embodiments, the authentication server encrypts the session key with the symmetric key.

23 Claims, 5 Drawing Sheets

Related U.S. Application Data continuation of application No. 16/252,262, filed on Jan. 18, 2019, now Pat. No. 10,938,803, which is a continuation of application No. 15/222,524, filed on Jul. 28, 2016, now Pat. No. 10,187,376.

(60) Provisional application No. 62/211,507, filed on Aug. 28, 2015.

(52) U.S. Cl.
CPC ...... *H04L 63/0435* (2013.01); *H04L 63/0442* (2013.01); *H04L 63/062* (2013.01); *H04L 63/0884* (2013.01)

(56) References Cited

U.S. PATENT DOCUMENTS

| | | | |
|---|---|---|---|
| 8,327,128 | B1 | 12/2012 | Prince et al. |
| 9,787,668 | B1* | 10/2017 | Marathe ............... H04L 63/102 |
| 10,069,914 | B1* | 9/2018 | Smith ................... H04L 67/568 |
| 10,193,879 | B1* | 1/2019 | Rodgers ............. G06F 9/45558 |
| 2003/0237004 | A1 | 12/2003 | Okamura |
| 2006/0080545 | A1* | 4/2006 | Bagley .................... G06F 21/31 |
| | | | 713/184 |
| 2007/0280482 | A1 | 12/2007 | Yan et al. |
| 2008/0232595 | A1* | 9/2008 | Pietrowicz ............ H04L 9/3297 |
| | | | 380/277 |
| 2010/0033300 | A1 | 2/2010 | Brandin |
| 2013/0091353 | A1 | 4/2013 | Zhang et al. |
| 2014/0331297 | A1* | 11/2014 | Innes .................. H04L 63/0823 |
| | | | 726/7 |
| 2015/0281278 | A1 | 10/2015 | Gooding et al. |
| 2015/0381621 | A1 | 12/2015 | Innes et al. |

OTHER PUBLICATIONS

Park et al., "A Lightweight IPsec Adaptation for Small Devices in IP-based Mobile Networks", 8th Int'l Cont. on Advanced Comm. Technology (IEEE, 2006), pp. 298-302.

Cheikhrouhou et al., "An EAP-EHash authentication method adapted to resource constrained terminals", Annals o lrelecommunications, vol. 65, No. 5 (Springer, 2009), pp. 271-284.

Bormann et al., "Terminology for Constrained-Node Networks", RFC 7228 (Internet Engineering Task Force, May ~014), 17 pages.

Kent, "Privacy Enhancement for Internet Electronic Mail: Part II: Certificate-Based Key Management", RFC 1224 Network Working Group, Feb. 1993), 28 pages.

Bersani et al., "The EAP-PSK Protocol: A Pre-Shared Key Extensible Authentication Protocol (EAP) Method", RFC ~764 (Network Working Group, Jan. 2007), 64 pages.

Wong et al., "Mutual Authentication and Key Exchange for Low Power Wireless Communications," 2001 MILCOM Proceedings Communications for Network—Centric Operations: Creating the formation Force (Cat. No. 01CH37277), McLean, VA, USA2001 pp. 39-43vol.1, year 2001.

Hummen, et al., "Delegation-Based Authentication and Authorization for the IP-Based Internet of Things," 2014 Eleventh Annual IEEE International Conference on Sensing, Communication, and Networking (SECON), pp. 284-292.

\* cited by examiner

AUTHENTICATION OF NETWORKED DEVICES HAVING LOW COMPUTATIONAL CAPACITY

CROSS-REFERENCE TO RELATED APPLICATIONS

This application is a continuation of U.S. patent application Ser. No. 17/159,016 filed on Jan. 26, 2021, which is a continuation of U.S. patent application Ser. No. 16/252,262 filed on Jan. 18, 2019 (now U.S. Pat. No. 10,938,803), which is a continuation of U.S. patent application Ser. No. 15/222,524 filed on Jul. 28, 2016 (now U.S. Pat. No. 10,187,376), which claims priority, under 35 U.S.C. § 119(e), to U.S. Provisional Patent Application No. 62/211,507, filed Aug. 28, 2015, all of which are incorporated herein by this reference.

STATEMENT REGARDING FEDERALLY SPONSORED RESEARCH OR DEVELOPMENT

Not applicable.

BACKGROUND OF THE INVENTION

This invention is in the field of data security. Embodiments are more specifically directed to the authentication of networked devices for secure communications.

Security of data communications is a significant issue in virtually every type of interconnected and networked system of electronic devices ranging from large-scale systems such as supercomputers to small scale systems such as the sensors and actuators envisioned for deployment in the "Internet of Things" (IoT). Indeed, small scale and highly distributed IoT devices are expected to be implemented in increasing numbers over a wide range of services and applications, including health, education, resource management, and the like. Unfortunately, these small scale systems can be particularly vulnerable to attack and compromise.

This increased vulnerability of sensors, actuators, and other IoT networked devices is due in large part to constraints on the computational capacity of these devices that are enforced to minimize device and system cost and also minimize power consumption, considering that many sensors, actuators, and other IoT networked devices will be remotely powered, whether by way of long life batteries, solar cells at the device, or from wireless communication signals. However, the complex computations involved in authentication of communications and other security functions such as encryption and decryption can be quite demanding on processor performance, especially at the level of security required of networks deployed in public places or that are managing critical operations. Deployment of networked devices in the IoT thus must address the competing needs of adequate security, on one hand, and low device cost and power consumption, on the other.

By way of further background, various approaches are known in the field of digital data cryptography, such as may be used for data communications, data storage and retrieval, and other applications. In general, the field of cryptography encompasses data encryption and decryption, digital authentication of digital data (e.g., sign/verify schemes), and the like. Public key cryptography, also referred to as asymmetric cryptography, is one common type. According to this approach, a public-private pair of "keys", each key being a block of data or information, are generated according to a particular algorithm. The public and private keys have an inverse relationship with one another based on a generator polynomial, such that the transmitting node secures the communication using one of the keys in the pair, and the receiving node decrypts or verifies the communication using the other key. More specifically, in the data encryption context, a block of data that is encrypted using the public key can be decrypted using the private key or vice versa; in the authentication context, a digital signature generated using the private key can be verified using the public key. The public and private keys are related to one another via a difficult mathematical problem (commonly referred to as a "trap-door function"), so that it is computationally difficult to determine a private key from knowledge of its corresponding known public key. For example, elliptic curve cryptography ("ECC") is a known type of public key cryptography in which the relationship of the public and private keys is based on the algebraic structure of elliptic curves over finite fields. In any case, public key cryptography allows the public key of a pair to be freely communicated, for example sent in an unsecured communication or listed in a public registry, without realistic risk that the private key can be calculated by an attacker. The public/private key approach is often favored because the private key can be kept secret by its owner, as opposed to symmetric key approaches in which both parties must share the same encryption key. On the other hand, symmetric key cryptography is much less computationally intensive.

As is well known in the art, the level of security provided by a particular public key scheme corresponds generally to the length of the keys; longer key lengths increase the difficulty of deriving the private key from the public key. Conventional bit lengths for both public and private keys under such cryptography algorithms as "DH", "DSA", and "RSA", range from on the order of 1024 bits to 15360 bits. While the level of security increases with longer keys, so does the necessary computational capacity required to encrypt and decrypt communications.

Several conventional techniques for implementing authentication protocols in devices with limited computational capacity, such as remote nodes in wireless networks, include various methods within an authentication framework known in the art as Extensible Authentication Protocol (EAP). According to the EAP framework, the remote node requests connection to a wireless network through an access point, which in turn requests identification data from the remote node and in turn transmits those identification data to an authentication server in the network. In response, the authentication server asks the access point for some proof that the identification data for the node are valid, for example by way of an authentication certificate provided by the node. Upon its receipt of this assurance of validity, the authentication server authorizes the node to be connected to the network. Conventional EAP methods that are applied to resource-limited devices utilize a symmetric key that is pre-shared by the node and the authentication server, as the computations required for symmetric key cryptography are less complex and less demanding of computational resources as noted above. Another example of a conventional approach is the communication protocol described in Park et al., "A Lightweight IPsec Adaptation for Small Devices in IP-based Mobile Networks", 8th *International Conference on Advanced Communication Technology* (IEEE, 2006), pp. 298-302, in which the number of public/private key operations by a resource-limited device is minimized to improve the overall performance of the protocol.

BRIEF SUMMARY OF THE INVENTION

Disclosed embodiments provide a system and method of networked communications that can be executed by networked devices of limited memory size and computational capability.

Disclosed embodiments provide such a system and method that provides a high level of security.

Disclosed embodiments provide such a system and method that allows secure communications by a networked device without requiring that device to execute asymmetric key operations.

Disclosed embodiments provide such a system and method that can be applied to various network architectures.

Other objects and advantages of the disclosed embodiments will be apparent to those of ordinary skill in the art having reference to the following specification together with its drawings.

According to certain embodiments, a supplicant in a network requests secure communications by transmitting a signed digital certificate with its authentication credentials to a proxy node. Upon verifying the certificate, the proxy node then authenticates the supplicant's credentials with an authentication server in the network, acting as a proxy for the supplicant node. Upon successful authentication, the authentication server creates a session key for communications by the supplicant node and communicates it to the proxy, which in turn transmits the session key to the supplicant node, for use in secure communications over the network.

DETAILED DESCRIPTION OF THE INVENTION

One or more embodiments are described in this specification as implemented into a distributed computing system including a number of network nodes, such as sensors, controllers, and the like in the "Internet of Things" ("IoT") context, as it is contemplated that these embodiments are particularly advantageous in such applications. However, it is also contemplated that concepts of this invention may be beneficially applied to other applications, for example local area or proprietary networks of electronic devices and systems outside of the IoT in which secure communications are desired. Accordingly, it is to be understood that the following description is provided by way of example only, and is not intended to limit the true scope of this invention as claimed.

Figure 1:
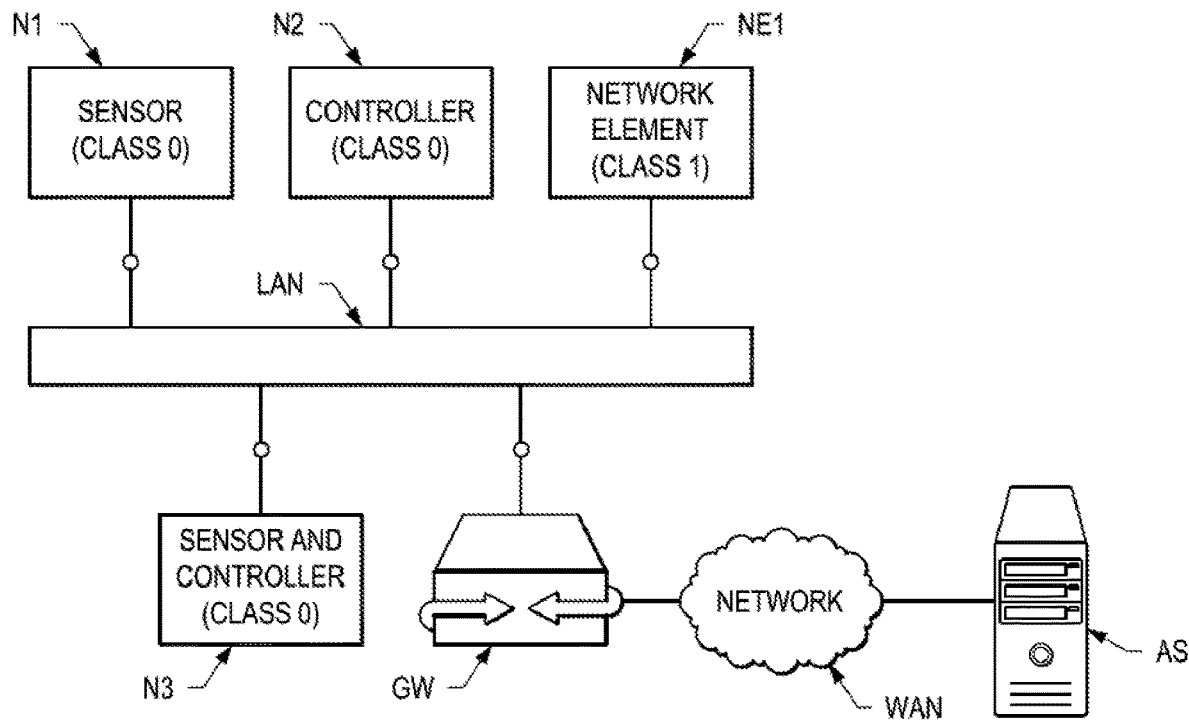
FIG. 1 is an electrical diagram, in block form, of an installation of a distributed networked system of controllers and sensors, in which embodiments of this invention are implemented.

FIG. 1 is a block diagram illustrating a distributed network system in which embodiments of this invention may be deployed. As known in the art, many modern networked systems include a number of devices capable of communicating with one another, for example by way of wireless communications. The number of nodes (i.e., the individual networked devices) in such a network can range from several nodes to on the order of hundreds, depending on the particular application. In the IoT context, such networks have become attractive in the contexts of facilities management (e.g., for environmental control and security management) and industrial control (e.g., control of motors and valves), among others.

In the high-level example of FIG. 1, several nodes N1, N2, N3, and NE1 are shown as in communication with one another and with network gateway GW via local area network LAN. In this example, nodes N1 through N3 (collectively referred to in this specification, in general, as nodes N), as well as node NE1, are contemplated to be deployed at various locations in a facility or environment, for example at locations in one or more rooms of a facility, at various locations outdoors, and at one or more pieces of industrial equipment. In the example of FIG. 1, node N1 serves only or primarily as a sensor, node N2 serves only or primarily as a controller (e.g. actuators), and node N3 performs both a sensor and a controller function. Network element NE1 may similarly serve as a sensor, controller, or both, but is also capable of executing higher level functions. For purposes of this description, the term "node" will refer to an installed electronic system or sub-system capable of serving as a sensor, or as a controller, or both, and that has a communications function for communicating with other nodes, and perhaps a host system, in a networked arrangement. In any case, the number of nodes performing particular functions in the overall network can vary. According to embodiments and as will also be described below, each node N includes computational circuitry, such as a microcontroller, microprocessor, or other large-scale programmable logic. In addition, some nodes N may have quite limited computational capacity relative to others. In the example of FIG. 1, nodes N1, N2, and N3 have limited computational capacity relative to network element NE1. As such, nodes N1, N2, and N3 will be referred to as "Class 0" nodes, while network element NE1 will be referred to as a "Class 1" node.

It is contemplated that network LAN by way of which the various nodes N1 through N3 and NE1 communicate among themselves will typically include wireless links among the devices, for example any one of a number of conventional protocols and physical layer standards, including IEEE 802.11a/b/g/n etc., Bluetooth, and Bluetooth 4.0 (i.e., Bluetooth Low Energy, or "BLE"). Alternatively, some or all of host H and nodes N1 through N5 may be connected in a wired network, e.g. Ethernet. In any case, it is contemplated that the conventional routers, switches, access points, and the like (not shown) for enabling such communications among nodes N1 through N3 and NE1, and gateway GW, will typically be present.

Network gateway GW also resides on network LAN, as noted above and as shown in FIG. 1. Gateway GW is realized by way of a system or device such as a router, switch, higher-level computer system, or the like that is constructed and operates to manage communication between networks that use different protocols from one another. As such, gateway GW will typically include a processor or other programmable logic, and some type of memory resource storing program instructions that, when executed by the processor, cause gateway GW to carry out its functions as a network gateway, including the various operations described herein. In this example, gateway GW manages communications between nodes N1 through N3 and NE1 residing on network LAN, on one hand, and nodes residing on wide area network WAN (e.g., a private wide area network, the Internet, or the IoT). The nodes residing on network WAN may include servers, computers and workstations installed at or near the facility or environment at which nodes N are placed or remotely therefrom, and other networks.

One such node residing on network WAN is authentication server AS, as shown in FIG. 1. In this context, authentication server AS represents a dedicated computer, Ethernet switch, access point, network access server, or other computer system executing a conventional software application, in the form of a network service, that facilitates authentication of an entity requesting access or permission for network communications. In actuality, authentication server AS and network gateway GW are separate logical entities, but need not necessarily reside at different physical nodes in the network. In some embodiments, authentication server AS may reside at network gateway GW itself; in other embodiments, authentication server AS resides at a node elsewhere in the overall network, for example at a location accessible to network gateway GW via wide area network WAN. The particular functions carried out by authentication server AS in connection with these embodiments will be described in further detail below.

Figure 2:
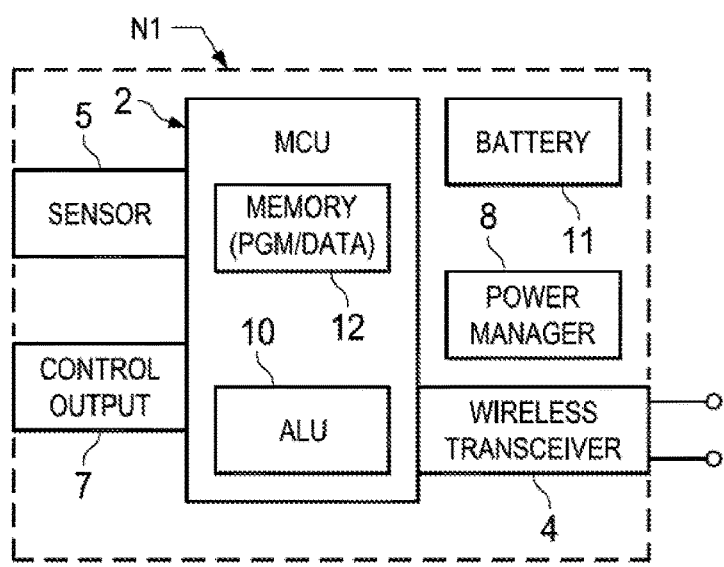
FIG. 2 is an electrical diagram, in block form, of a lower level node device in the system of FIG. 1, according to an embodiment of the invention.

As mentioned above, Class 0 nodes N1 through N3 in the example of FIG. 1 represent sensors, controllers, or other networked devices that are relatively resource-limited, from the standpoint of computational capacity and memory size. By way of example, FIG. 2 illustrates the high-level architecture of node N1 according to an embodiment. The other nodes N2 through N3 may be constructed by a similar architecture or by way of alternative architectures; in any case, it is contemplated that the specific hardware used to realize may differ among nodes N, but for purposes of this description will have limited computational resources. It is contemplated that those skilled in the art having reference to this specification will be readily able to implement the hardware necessary and useful to realizing the architecture applicable to embodiments of this invention as suitable for a particular application, without undue experimentation.

More specifically, node N1 in this embodiment of the invention corresponds to a programmable subsystem including embedded microcontroller unit (MCU) 2 in combination with various peripheral functions. It is contemplated that node N1 will be typically be physically realized by way of a single circuit board on which MCU 2 will be mounted, along with other integrated circuits and discrete components as appropriate for the desired functions of node N1, with this circuit board typically being housed in the appropriate housing or enclosure suitable for its environment. Alternatively, node N1 may be realized by way of multiple circuit boards, or a single integrated circuit, or as a part of a larger electronic system, depending on its functionality.

In this embodiment, MCU 2 in node N1 includes a processor or other programmable logic that carries out selected functions relating to secured data communications with other nodes within and external to network LAN. In the example of FIG. 2, the processor is in the form of arithmetic logic unit (ALU) 10, which executes program instructions as may be stored in memory resource 12. It is contemplated that many devices used in the IoT as sensors, controllers, etc. will have relatively limited central processing units, memory size, and power resources, so as to minimize their cost and power consumption. In this embodiment, nodes N1 through N3 are constructed to be of this resource-limited type. For example, according to the classification described in "Terminology for Constrained-Node Networks", RFC 7228, published by the Internet Engineering Task Force (IETF), May 2014 (available at http://tools.ietf.org/pdf/rfc7228.pdf), incorporated herein by reference, "Class 0" devices are those with data memory (e.g., RAM) of a size substantially less than 10 KiB (1 KiB=1024 bytes) and program memory (e.g., flash memory) of a size substantially less than 100 KiB. "Class 1" devices under this classification are those with data memory of a size of about 10 KiB and program memory of a size of about 100 KiB, while "Class 2" devices have about 50 KiB of data memory and 250 KiB of program memory. As such, following this classification, memory resource 12 of node N1, as a Class 0 device, is contemplated to contain substantially less than 100 KiB of program memory and substantially less than 10 KiB of data memory within its total address space. For example, it is contemplated that memory resource 12 of node N1 may have a total memory size of as small as on the order of 2 KiB, including both data and program memory. The particular arrangement of memory resource 12 as one or multiple memories within or external to MCU 2, as well as the memory technology used to realize memory resource 12, may vary depending on the particular realization. In any case, it is contemplated that the computational capability of MCU 2 of node N1 will be quite limited as a result of these limitations on available memory.

In this example, node N1 includes several other circuit functions as appropriate for its intended purpose in the network of FIG. 1. Communications with network LAN is carried out by way of transceiver function 4, which is realized in the conventional manner for communications over the appropriate wired or wireless communications facility, for example by way of a conventional protocol and physical layer standard, such as Bluetooth, Bluetooth Low Energy (BLE), wireless LAN (802.11x), cellular wireless communications, or according to a wired protocol and standard such as Ethernet and the like. In this IoT example, node N1 includes one or more input/output functions for interacting with its physical environment, for example one or more of either or both of sensor function 5 and control output circuit 7, each coupled to and controlled by MCU 2. The particular numbers and functions of input/output functions (i.e., sensor functions 5 and control output circuits 7) will depend on the conditions and operations that node N1 is to carry out in the networked system. Examples of sensor function 5 suitable for use in facilities management and industrial control include temperature sensors, motion sensors, humidity sensors, transducers of various types as suitable in industrial instrumentation, cameras, thermal imaging sensors, photosensors, and the like. Conversely, control output circuit 7 corresponds to a conventional driver or other circuit of the appropriate output power for the desired output or control function of node N1. Examples of control output circuit 7 suitable for use include analog output driver circuitry, serial and parallel digital outputs, pulse-width-modulated (PWM) output driver circuitry, driver circuitry for an alarm or an annunciator, and LED drivers, to name a few.

In this embodiment of the invention, node N1 also includes power manager function 8, which controls the powering of the various functions within node N1 by battery 11. Alternatively, node N1 may be powered from wired power (e.g., power over USB, DC output from a rectifier or micro-grid), solar power, wireless power transfer (e.g., over the wireless communications facility or separately), and the like. Often, however, Class 0 nodes such as node N1 are resource-limited in order to conserve power, and as such are typically powered remotely, such as by way of battery 11 as shown in FIG. 2.

Other circuitry and functions such as input and output drivers, analog-to-digital converters, digital-to-analog converters, clock circuits, voltage regulators, and the like may also be realized at node N1. It is contemplated that those skilled in the art having reference to this specification will readily comprehend other necessary support circuitry included within MCU 2.

As known in the art, networked systems, particularly those in which nodes may be deployed remotely from one another and from the host, are vulnerable to security breaches. In particular, communications among the nodes are vulnerable to both detection (i.e., snooping) and also to insertion of unauthorized program code and data (e.g., viruses and bots). As such, the security of communications among the nodes in a networked system such as that shown in FIG. 1, and between those nodes and network elements accessible via wide area network WAN, is critical to most applications. As discussed above in connection with the Background of the Invention, however, resource-limited network elements, such as the Class 0 nodes N1 through N3 in the arrangement of FIG. 1, are not capable of efficiently processing the complex computational operations required by security protocols necessary to attain the desired level of security, and thus their communications can be vulnerable to attack. Conversely, the computational capability required to implement the desired level of security is not readily compatible with the low cost and low power constraints desired for remote network nodes, such as sensors and controllers deployed as contemplated by the IoT.

In contrast, it is contemplated that other network nodes, for example network element NE1 in the architecture of FIG. 1, may have a substantially higher computational capacity, such that these nodes are considered, under the above-incorporated RFC 7228 classification, as "Class 1" or higher nodes in the network. For example, network element NE1 may be constructed of an architecture similar to that shown in FIG. 2, with a total memory capacity, including both program memory and also data memory within the same or different address spaces, of on the order of 110 KiB. In addition, Class 1 network element NE1 may have either a larger battery 11 than Class 0 nodes N1 through N3, or may be in a more accessible location so as to be readily serviced with replacement batteries, or may receive external power either to charge its battery 11 or to power its overall operation. As such, the computational capacity of the Class 1 node realized as network element NE1 in this architecture is substantially greater than that of Class 0 nodes N1 through N3 in this embodiment.

As typical in the art, secure communications require authentication of each network node according to a particular protocol, such that a given node can be accepted by others as a trusted source or destination in the network. Conventional authentication typically involves a particular identifying "detail" known by the network node to confirm its identity, and the exchange of messages between the node and an authentication server according to the security protocol to establish a secure channel.

According to these embodiments, higher computational capacity (Class 1 or greater) nodes, such as network element NE1, are used as proxies for purposes of authenticating lower computational capacity (e.g., Class 0) nodes, such as nodes N1 through N3, for secure communications by those lower capacity nodes over local area network LAN and perhaps wide area network WAN. More particularly, according to these embodiments, Class 1 nodes are used to execute the more computationally complex operations involved in the authentication of Class 0 nodes, such operations including, for example, asymmetric key cryptography operations including encryption and decryption using public/private key pairs. As a result, the less computationally capable Class 0 nodes can be authenticated at a high security level without overburdening their capability or consuming undue amounts of power.

Figure 3:
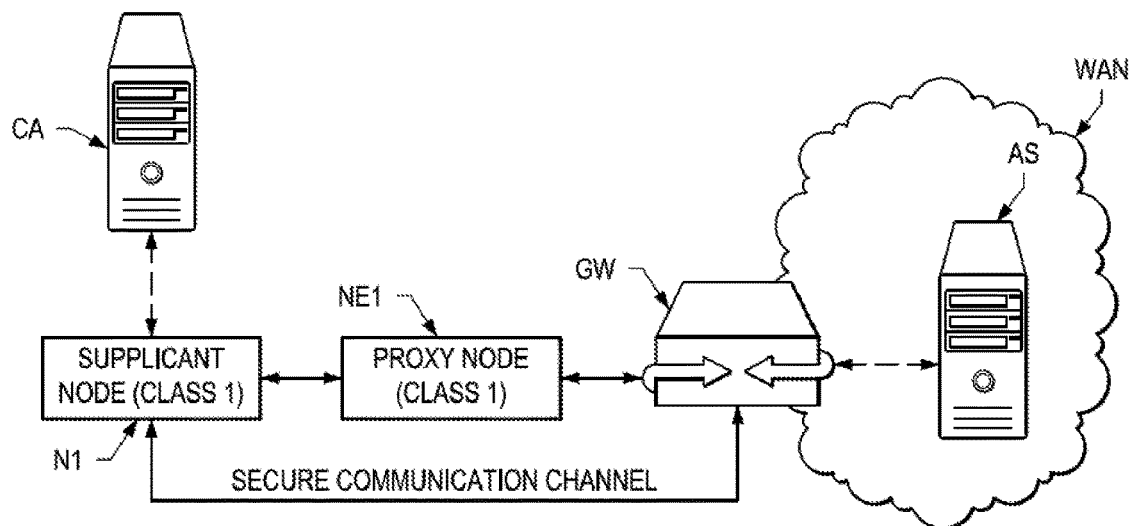
FIG. 3 is an electrical diagram, in block form, of the logical architecture of the network of FIG. 1 in authenticating a network node.

An authentication protocol for authenticating a Class 0 network node for secure communication over local area network LAN and wide area network WAN of FIG. 1, according to an embodiment, will now be described. FIG. 3 illustrates the logical architecture for this authentication protocol, in which Class 0 node N1 is being authenticated via network element NE1, acting as a proxy for node N1. Accordingly, node N1 will be referred to as the "supplicant node", and network element NE1 will be referred to as the "proxy node". Authentication in this example will be carried out by proxy node NE1, on behalf of supplicant node N1, communicating with an authentication server AS via (or implemented at) network gateway GW.

Figure 4:
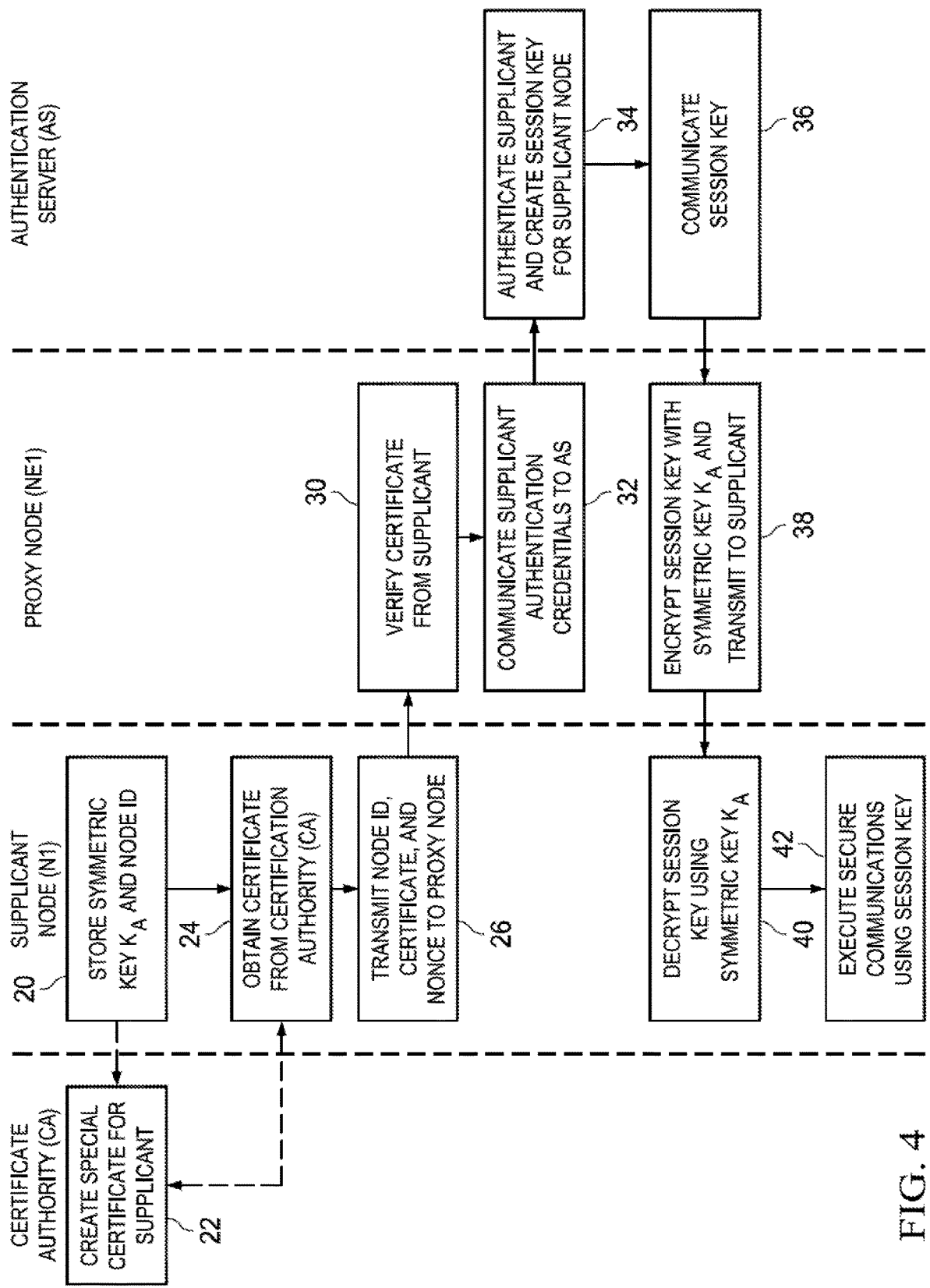
FIG. 4 is a flow diagram illustrating a process of authenticating a supplicant network node according to an embodiment.

FIG. 4 illustrates the operation of the various elements in the logical architecture of FIG. 3 in authenticating supplicant node N1. In this embodiment, the authentication process utilizes a symmetric key $K_A$ that is pre-programmed or otherwise stored in memory resource 12 of supplicant node N1, in process 20. Also in process 20, supplicant node N1 is pre-programmed with a node identifier, as conventional in the art. The symmetric key $K_A$ and the node identifier are shared with certificate authority CA (FIG. 3), typically in advance of any instance of the authentication process. As known in the art, a certificate authority, or "certification authority", refers to some entity that is a "trusted third party" that issues digital certificates for nodes on the particular network. In this example, certificate authority CA operates as such a trusted third party, and is trusted by the network operator and by those parties with which the network elements will be communicating. For public-key schemes, certificate authority CA is accessible over the Internet, and provides digital certificates used in public/private (i.e., asymmetric) key cryptography and authentication.

In process 22, certificate authority CA (FIG. 3) creates and stores a digital certificate for supplicant node N1. As known in the art, digital certificates are digital files that certify the identity of a particular network element, in a form that can be verified by other network elements. A typical conventional digital certificate (i.e., a "general" certificate) includes a plaintext (also referred to as "plain text" or "cleartext") portion and an encrypted (cyphertext) portion (typically both portions "hashed" by a conventional hash algorithm prior to encryption), each including such information as a certificate authority identifier, identifying the certificate authority CA that issued the certificate, a node identifier for the network node for which the certificate is created, and a digital signature field that specifies the public key algorithm and relevant parameters used by the certificate authority CA to sign the certificate, and any parameters associated with the algorithm. For example, the digital signature may involve the combination of a Certificate Integrity Check (CIC) algorithm in combination with a public-key encryption algorithm. The public key encryption algorithm is that used by the certificate authority to encrypt the cyphertext portion of the certificate. Verification of the certificate is performed by decrypting the cyphertext portion of the certificate with the public key for the certificate authority, and comparing that decrypted cyphertext portion with the plaintext version (following computation of the hash).

Figure 5A:
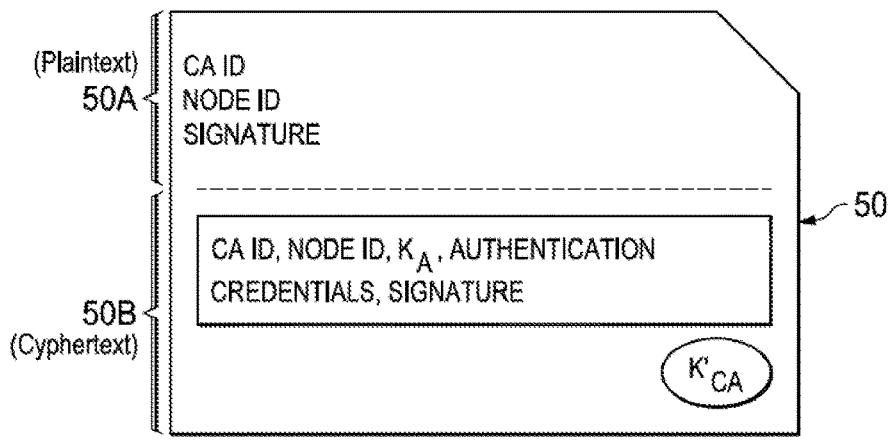
FIGS. 5a and 5b are diagrams illustrating the arrangement of digital certificates according to respective embodiments.

According to these embodiments, additional information is included in a special digital certificate created in process 22 at the certificate authority CA for supplicant node N1. FIG. 5a illustrates the contents of an example of this special digital certificate. In this embodiment, signed digital certificate 50 includes plaintext portion 50A and a corresponding cyphertext portion 50B. Plaintext portion 50A includes the certificate authority identifier CA ID, the node identifier NODE ID for supplicant node N1, and the digital signature field for certificate authority CA. According to this embodiment, cyphertext portion 50B includes certificate authority identifier CA ID, the node identifier NODE ID for supplicant node N1, and the digital signature field for certificate authority CA, along with two additional fields. These additional fields present in cyphertext portion 50B are the symmetric key $K_A$ for supplicant node N1, which was previously shared with certificate authority CA, and also "authentication credentials" for supplicant N1. These authentication credentials include the credentials for supplicant node N1 that can be authenticated by authentication server AS. These credentials are in the appropriate form as used by any network element in the relevant network to authenticate its communication with authentication server AS (i.e., if it were doing so directly). These contents are encrypted with a private key $K'_{CA}$ stored at certificate authority CA. Accordingly, in this special digital certificate 50, the symmetric key $K_A$ and the authentication credentials of supplicant node N1 are provided only in cyphertext 50B, "signed" with the private key $K'_{CA}$. This private key $K'_{CA}$ is paired with a public key $K_{CA}$ that will be used to decrypt cyphertext 50B in the verification of the digital signature of certificate 50.

In addition, this embodiment can attain an additional level of security by limiting the distribution of public key $K_{CA}$, for example only to those network elements (e.g., proxy node NE1) that have a need to verify the special digital certificate. By keeping the public key $K_{CA}$ (and its private key $K'_{CA}$ known only at certificate authority CA) as a "secret" in this manner, other network elements will not be readily able to verify special digital certificate 50 and thus will not be authorized to act as a proxy for supplicant node N1 in its authentication.

Referring back to FIG. 4, supplicant node N1 obtains its special digital certificate 50 (i.e., the instance of certificate 50 including its node identifier, authentication credentials, and symmetric key $K_A$) from certificate authority CA in process 24, and stores it in its memory resource 12. While this obtaining of certificate 50 may be performed at the time of authentication, it is contemplated that processes 20, 22, 24 will typically be performed prior to authentication (i.e., "offline"), such that certificate 50 is stored at supplicant node N1 in advance, for example prior to its installation into the network.

At such time as supplicant node N1 wishes to authenticate itself so as to carry out secure communications over the network, supplicant node N1 transmits certain information to proxy node NE1 in process 26. The information transmitted by supplicant node N1 to proxy node NE1 includes the special digital certificate 50 prepared by certificate authority CA in process 22 and stored in supplicant node N1, along with the node identifier (NODE ID) for supplicant node N1, to facilitate recognition of the source of the transmission by proxy node NE1. It is contemplated that this transmission of certificate 50 and node identifier NODE ID will typically also be accompanied by a "nonce", typically an arbitrary pseudo-random number used only once in a cryptographic communication between two nodes to improve security, as known in the art.

In process 30, proxy node NE1 receives the transmission from supplicant node N1, and verifies the special digital certificate 50 in that transmission. In this embodiment, proxy node NE1 performs this verification of certificate 50 by decrypting its cyphertext 50B using the secret public key $K_{CA}$, and by comparing contents of that decrypted portion (i.e., a digest of the certificate authority identifier, the node identifier, and the signature) with those contents provided in plaintext 50A of certificate 50. As known in the art, this comparing may involve the computing of a hash of plaintext 50A to create a digest, and comparing that computed digest with the decrypted digest of cyphertext 50B. Other conventional approaches for verifying a digital signature of special digital certificate 50 may alternatively be used in process 30. Upon verifying certificate 50 in process 30, proxy node NE1 locally stores the symmetric key $K_A$ included in cyphertext 50B, as well as the value of the nonce transmitted by supplicant node N1 with the special digital certificate 50 in process 26.

Also upon verification of the signed certificate 50, proxy node NE1 begins the authentication of supplicant node N1 for secure communications by communicating the authentication credentials contained in cyphertext 50B of special digital certificate 50 to authentication server AS, in process 32. As described above, authentication server AS is a logical entity corresponding to the execution of a network service software application that authenticates entities for secure network communications, where the authentication is performed according to a particular security protocol involving an identifying detail from the requesting entity and message exchange between the authentication server AS and the entity. Because in actuality authentication server AS and network gateway GW are separate logical entities, authentication server AS may reside at a separate physical network node (i.e., dedicated computer, Ethernet switch, access point, network access server, or other computer system executing the authentication service) from network gateway GW, for example at a node accessible to gateway GW via wide area network WAN. Alternatively, authentication server AS and network gateway GW may reside at the same physical network node.

In any case, for the architecture of FIG. 3 by way of example, process 32 is performed by proxy node NE1 transmitting the authentication credential and node identifier for supplicant node N1 (from signed certificate 50) over local area network LAN to network gateway GW, which in turn communicates that information to authentication server AS. If authentication server AS is at a separate physical network node than gateway GW, process 32 also includes transmission of the authentication credential and node identifier for supplicant node N1 from gateway GW over wide area network WAN to the physical node at which authentication server AS resides. In any case, the manner in which proxy node NE1 transmits the authentication credential and node identifier for supplicant node N1 is the same as if proxy node NE1 were authenticating itself for secure communications, and as such follows the same authentication protocol as would be followed in that case. Confirmation that the appropriate protocol for proxy authentication, according to this embodiment, is supported by proxy node NE1 may be ensured by authentication server AS and proxy node NE1 sharing the appropriate protocol in advance, or by including a protocol specific code in the special digital certificate 50 communicated from proxy node NE1 to authentication server AS.

In process 34, authentication server AS executes the appropriate operations for authenticating supplicant node N1 from the authentication credential and node identifier communicated from proxy node NE1. The particular operations performed by authentication server AS in this process 34 will depend on the specific security protocol that is in place. It is contemplated that this authentication process 34 will typically be performed in a conventional manner, without authentication server AS necessarily being aware that the authentication is being carried out with proxy node NE1 rather than the supplicant node N1 itself. Upon successful authentication of the credential, authentication server AS creates a session key $K_S$ for use by the authenticated supplicant node N1 in its secure communications over the network. In process 36, authentication server 36 communicates this session key $K_S$ to proxy node NE1, via gateway GW in the logical architecture of FIG. 3 according to this example.

According to this embodiment, the creation of session key $K_S$ for supplicant node N1 in process 34 and communication of that session key $K_S$ to proxy node NE1 in process 36 are carried out by authentication server AS in the same manner as if proxy node NE1 were in fact the node being authenticated. In other words, the authentication of supplicant node N1 by proxy node NE1 in this embodiment is entirely transparent to authentication server AS. As such, proxy authentication according to this embodiment can be readily implemented in existing networks, without requiring any change in the operation of authentication server AS.

In process 38, proxy node NE1 encrypts the session key $K_S$ created by authentication server AS, along with the same nonce transmitted by supplicant node N1 in process 26 and the node identifier for supplicant node N1. This encryption of process 38 is executed using the symmetric key $K_A$ that was contained in the special digital certificate 50 forwarded earlier by supplicant node N1 in process 26, according to any one of a number of conventional symmetric key encryption techniques as agreed upon with supplicant node N1. Also in process 38, proxy node NE1 transmits those encrypted information including session key $K_S$ to supplicant node N1 over local area network LAN.

On receipt of the encrypted session key $K_S$ from proxy node NE1, supplicant node N1 decrypts the session key $K_S$ using the same symmetric key $K_A$, in process 40. As known in the art, symmetric key decryption is much less computationally intensive than the asymmetric key cryptography operations involved in such operations as verifying digital certificates (e.g., process 30). It is contemplated that Class 0 network elements such as supplicant node N1 are quite capable of performing the symmetric key decryption of process 40, without overburdening its processor or unduly consuming battery power. Following decryption process 40 to recover session key $K_S$, supplicant node N1 can then carry out secure communications over the network in process 42, including over local area network LAN and, via network gateway GW (FIG. 3), secure source and destination nodes on wide area network WAN.

According to this embodiment, therefore, the computationally intensive and power hungry operations involved in the authentication of a network node with limited computational resources (e.g., of Class 0) are performed by a more capable (e.g., Class 1) network element, as a proxy for the less capable node being authenticated. In addition, as mentioned above, this embodiment may be readily implemented without requiring any modification in the programming or operation of the authentication server. Accordingly, this embodiment can provide a high level of security for low cost and remotely deployed network nodes such as sensors, controllers, and other devices contemplated in the IoT context.

As described in the above embodiment, the verification of the special digital certificate 50 in process 30 requires proxy node NE1 to have plaintext capability, specifically the ability to recover the contents of plaintext 50A in certificate 50 for comparison with contents of the decrypted cyphertext portion 50B. It is contemplated that some Class 1 network elements may not be programmed to recover and operate on plaintext. For example, network elements executing security schemes that do not recover plaintext, such as the Elliptic Curve Digital Signature Algorithm (ECDSA), cannot readily verify certificate 50 as described above. According to another embodiment, an alternative special digital certificate not requiring plaintext recovery is used to carry out the verification of a supplicant node at its proxy node.

Figure 5B:
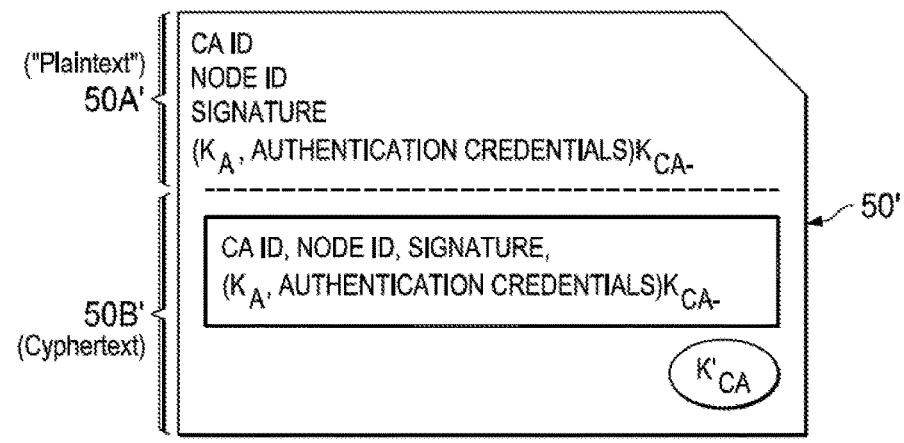

FIG. 5b illustrates the arrangement of special digital certificate 50' according to this embodiment. In this arrangement, certificate 50' includes plaintext portion 50A' and cyphertext portion 50B', similar to special certificate 50 described above relative to FIG. 5a. In particular, plaintext portion 50A' includes the certification authority identifier, node identifier, and digital signature fields in plaintext, as before. However, according to this embodiment, plaintext portion 50A' also includes encrypted information, specifically the symmetric key $K_A$ with which the session key $K_S$ will be encrypted before transmission to supplicant node N1, along with the authentication credentials for supplicant node N1, encrypted with a symmetric key $K_{CA-}$. Cyphertext portion 50B' of certificate 50' includes the same contents as plaintext portion 50A', namely the certification authority identifier, node identifier, and digital signature fields, along with the symmetric key $K_A$ and the authentication credentials for supplicant node N1, with these two elements encrypted together with symmetric key $K_{CA-}$; in cyphertext portion 50B', all of these contents (i.e., both the plaintext information and the encrypted key $K_A$ and credentials) are encrypted according to an asymmetric key encryption algorithm using the private key $K'_{CA}$. As before, this private key $K'_{CA}$ is paired with the full public key $K_{CA}$ that will be used by proxy node NE1 to verify certificate 50', and that is established by certificate authority CA. As noted above, public key $K_{CA}$ is preferably kept as a "secret" among those nodes that are authorized to serve as proxy nodes and that verify the certificates 50, 50'.

The symmetric key $K_{CA-}$ according to this embodiment is a portion of this public key $K_{CA}$ used to encrypt cyphertext portion 50B' of certificate 50'. In one example, symmetric key $K_{CA-}$ is the first (i.e., most significant) sixteen bytes of the full public key $K_{CA}$, which is thirty-two octets in length (an octet being a pair of hexadecimal digits). Accordingly, because both certificate authority CA and proxy node NE1 know the full public key $K_{CA}$, both also know or can readily derive the symmetric key $K_{CA-}$ used in certificate 50'. In addition, if public key $K_{CA}$ is being kept as a secret among only the authorized nodes, symmetric key $K_{CA-}$ will of course also be maintained as a secret.

According to this embodiment, therefore, verification of certificate 50' in process 30 (FIG. 4) is performed by proxy node NE1 decrypting cyphertext portion 50B' using the full public key $K_{CA}$. Proxy node NE1 also decrypts the symmetric key $K_A$ and authentication credentials in plaintext portion 50A' using symmetric key $K_{CA-}$, and compares those contents with the same contents (symmetric key $K_A$ and authentication credentials) in cyphertext portion 50B' after decryption using symmetric key $K_{CA-}$. The comparison may be performed by comparing hash digests, etc., as known in the art for verifying certificates. According to this embodiment, however, recovery of plaintext is not required at proxy node NE1, which enables use of these embodiments in a wider range of secure network systems.

Figure 6:
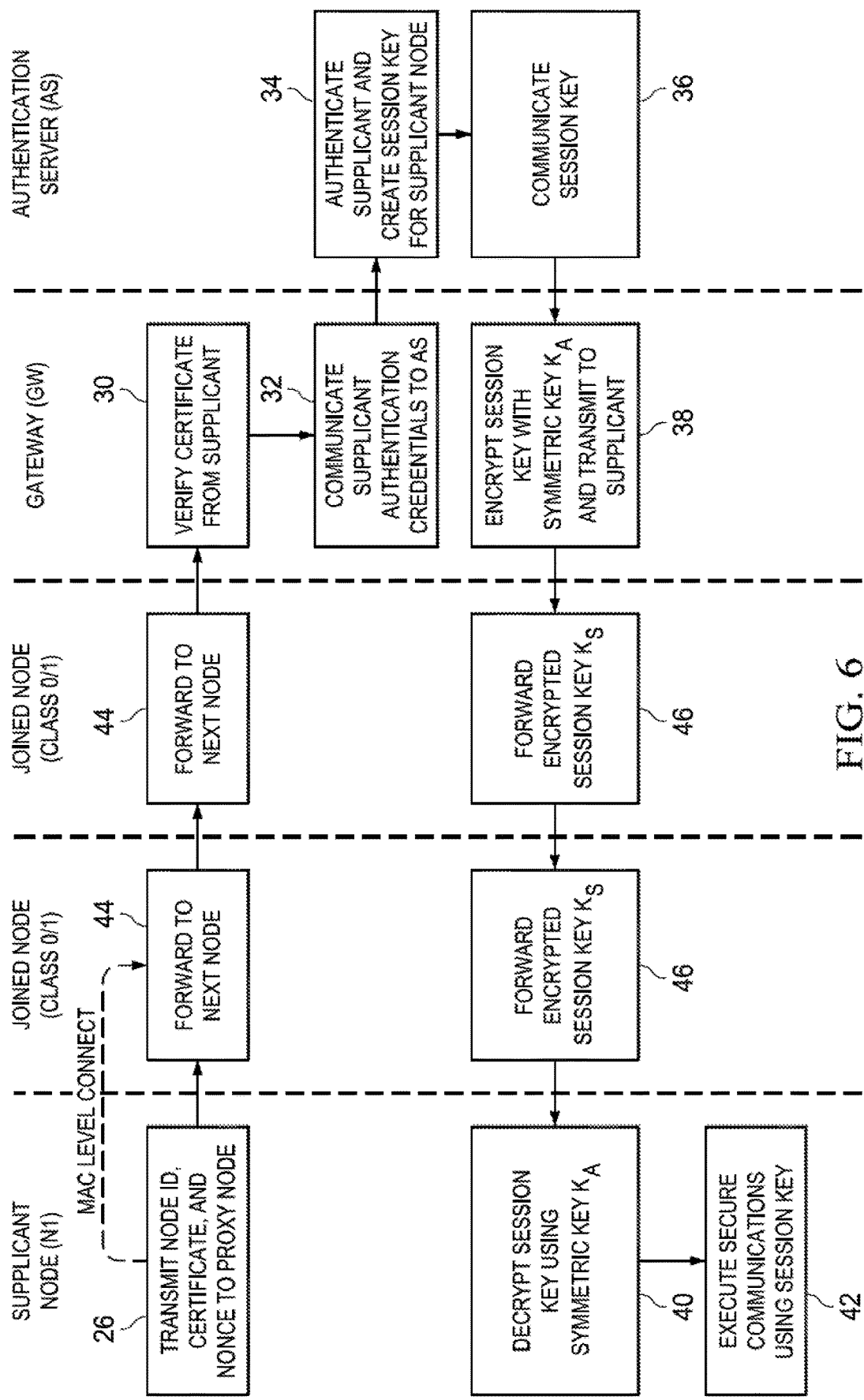
FIG. 6 is a flow diagram illustrating a process of authenticating a supplicant network node according to another embodiment.

According to another embodiment, as will now be described in connection with FIG. 6, the proxy for supplicant node N1 is not located in a device out in the network, such as network element NE1, but rather is implemented at network gateway GW, which will carry out the authentication of supplicant node N1 with authentication server AS. As mentioned above, gateway GW and authentication server AS are separate logical entities in this network, but need not necessarily be realized in different physical entities. As such, authentication server AS may be located at a network node physically accessible to gateway GW over wide area network WAN, but physically remote; alternatively, authentication server AS may be physically deployed at gateway GW itself.

Also in this embodiment, supplicant node N1 is not in direct communication with its proxy (at gateway GW in this example), but rather will communicate indirectly with its proxy via one or more "joined" nodes in the network. Each communication link among supplicant node N1 and these joined nodes may be in the same local area network LAN, or one or more of the joined nodes may reside in another local area network to which communications can be relayed by one of the joined nodes. As will be evident from the following description, these joined nodes will not execute cryptography operations in the authentication process, and as such may have limited computational resources (Class 0) or may have higher computational capability (Class 1 or higher).

In the process flow of FIG. 6, supplicant node N1 again has obtained its special digital certificate 50 (or 50', as the case may be) from certificate authority CA. In addition, according to this embodiment, supplicant node N1 has made a channel connection, such as at the media access control (MAC) level, with a joined node in the network, in the manner well known in the art. One that connection is made, supplicant node N1 transmits its node identifier, a nonce, and the special digital certificate 50, 50' to the first joined node in process 26. Once received, that joined node forwards the same information to a next node in an instance of process 44. That next node may be another joined node, which in turn will again forward the packet from supplicant node N1 in another instance of process 44, or may be the eventual proxy node, whether at a network element (e.g., node NE1) or network gateway GW. In the process flow of FIG. 6 according to this example, two joined nodes are in the path between supplicant node N1 and its proxy at gateway GW, and as such process 44 is performed twice.

According to this embodiment in which network gateway GW serves as the proxy node for authentication of supplicant node N1, authentication of supplicant node is carried out between gateway GW and authentication server AS in the manner described above. To summarize, gateway GW verifies the signed digital certificate 50, 50' in process 30 and, in its role as the proxy for supplicant node N1, recovering the symmetric key $K_A$ included in that certificate, and communicates the authentication credentials in that certificate to authentication server AS in process 32. Authentication server 34 authenticates supplicant node N1 from those credentials, and creates a session key $K_S$ for supplicant node N1, in process 34, and communicates that session key $K_S$ to gateway GW in process 36. Gateway GW encrypts the session key $K_S$ created by authentication server AS, along with the same nonce transmitted by supplicant node N1 and the node identifier for supplicant node N1, all with the symmetric key $K_A$ recovered in process 30, and forwards that encrypted data to one of the joined nodes. The joined nodes then forward the encrypted session key $K_S$ (and nonce and node identifier) to supplicant node N1, in one or more instances of process 46, depending on the number of "hops" in the communication link between supplicant node N1 and gateway GW. Supplicant node N1 decrypts the encrypted data including session key $K_S$ on receipt in process 40, and begins secure communications using that session key $K_S$ in process 42, as before.

In the alternative, if supplicant node N1 can directly communicate with gateway GW, the communications via the various joined nodes need not be included. Conversely, the use of intermediate joined nodes may alternatively be implemented in those situations in which a Class 1 network element (e.g., node NE1) is to serve as a proxy.

Figure 7:
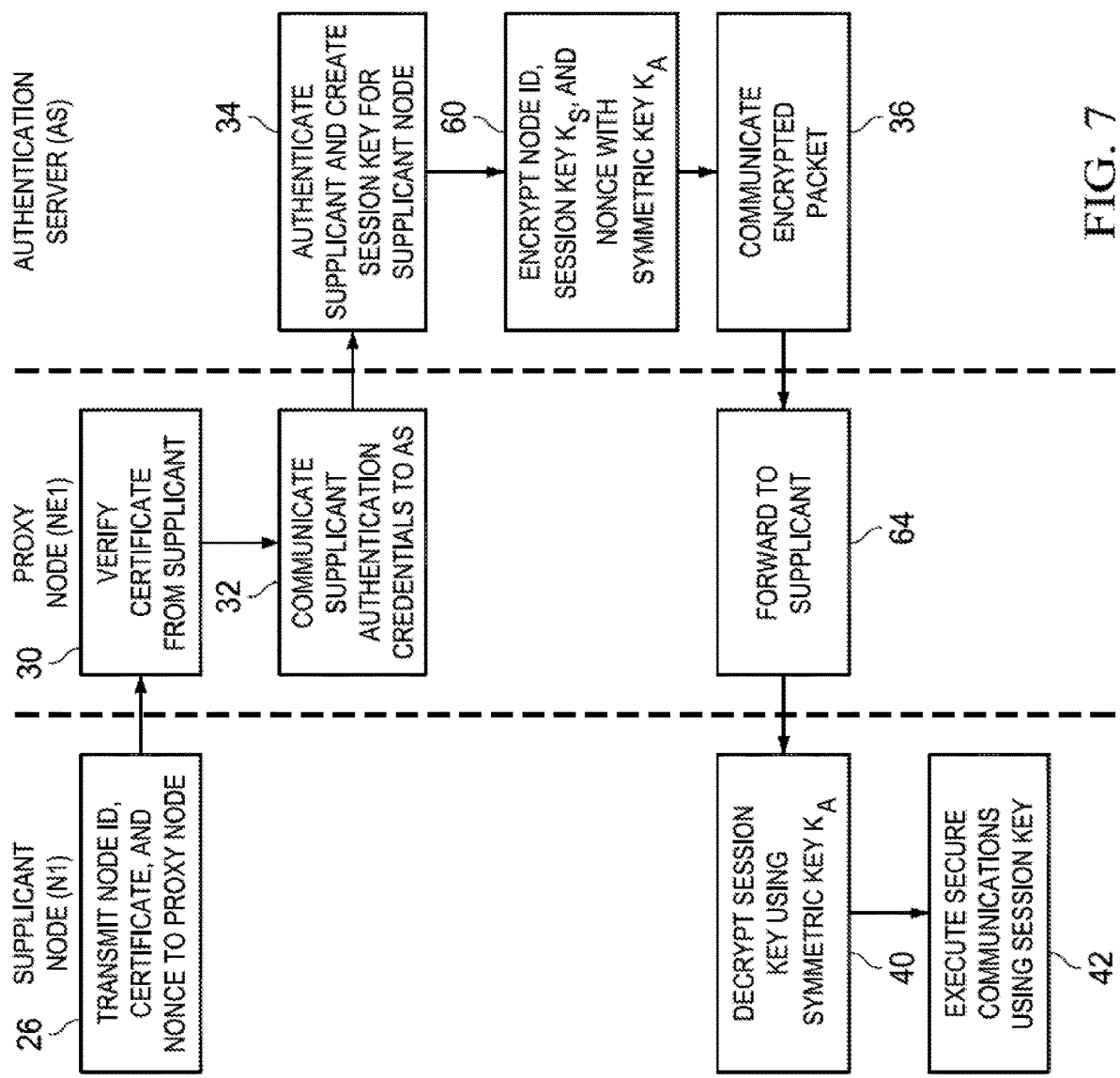
FIG. 7 is a flow diagram illustrating a process of authenticating a supplicant network node according to another embodiment.

The above-described embodiments may all be implemented without any modifications or reprogramming of authentication server AS from its conventional construction and operation. In the alternative, however, authentication server AS may be modified to improve the overall security of the authentication process by itself encrypting the session key $K_S$ with the symmetric key $K_A$, rather than this encryption being carried out by the proxy. This alternative approach is illustrated in FIG. 7, which follows the same process as described above relative to FIG. 4 through the authentication of supplicant node N1 by authentication server AS in process 34, except that the symmetric key $K_A$ is not included in the special digital certificate 50, 50', but rather is stored at authentication server AS prior to the authentication process. In the authentication process 34, however, authentication server AS is able to see that the node identifier for supplicant node N1 differs from the node (proxy node NE1) that is carrying out the authentication, and thus detects that the authentication is being performed by proxy. Upon successful authentication and creation of the session key $K_S$ in this proxy situation, authentication server AS encrypts the node identifier, the nonce (transmitted by supplicant node N1), and the session key $K_S$ using the pre-stored symmetric key $K_A$, in process 60. This encrypted information is communicated to proxy node NE1 in process 62, and proxy node NE1 forwards that information to supplicant node N1 for decryption of the session key in process 40. Security is enhanced in this approach because the session key $K_S$ is communicated through the proxy node NE1 in an encrypted fashion, rather than the session key possibly being visible in plaintext. As such, "spoofing" of supplicant node N1 is prevented even if proxy node NE1 is somehow compromised.

As discussed above, the various embodiments described in this specification provide important advantages in the security of network communications, particularly in the IoT context in which it is expected that many of the networked devices will have limited computational capacity or are remotely powered. In these embodiments, those computationally complex operations as required in such high security algorithms such as are used in asymmetric key cryptography are performed by network elements having sufficient computational resources and power resources, as proxies for the limited resource nodes. As a result, more complex keys that provide higher security can be used, without increasing the cost or power costs at the more numerous sensor, controller, and other remote nodes.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method comprising:
    receiving, by a first device, a digital certificate, wherein the digital certificate includes an authentication credential associated with a second device;
    verifying, by the first device, the digital certificate using asymmetric key cryptography;
    in response to the verifying, transmitting the authentication credential;
    after transmitting the authentication credential, receiving, by the first device, a session key associated with the second device; and
    transmitting, by the first device, the session key using symmetric key cryptography.

2. The method of claim 1, wherein the digital certificate comprises a symmetric encryption key, the method further comprising:
    encrypting the session key with the symmetric encryption key.

3. The method of claim 2, further comprising:
    receiving, by the first device and with the digital certificate, a nonce.

4. The method of claim 3, wherein:
    the nonce comprises a pseudo-random number.

5. The method of claim 3, further comprising:
    in response to verifying the digital certificate, storing the symmetric encryption key and the nonce in the first device.

6. The method of claim 1, further comprising:
    transmitting, by the first device, the authentication credential and an identifier of the second device extracted from the digital certificate to an authentication device.

7. The method of claim 6, further comprising:
    prior to transmitting the authentication credential and the identifier to the authentication device, determining a protocol for authentication.

8. The method of claim 6, further comprising:
    transmitting a protocol code to the authentication device, wherein the protocol code identifies a protocol for authentication.

9. The method of claim 1, where verifying the digital certificate comprises computing a hash of a first portion of the digital certificate.

10. The method of claim 1, wherein the digital certificate comprises a first portion and a second portion, the second portion including the authentication credential and a symmetric encryption key.

11. The method of claim 10, wherein the second portion further includes an identifier of the second device, and a certificate authority identifier.

12. The method of claim 10, wherein verifying the digital certificate comprises decrypting the second portion using an asymmetric key to extract the symmetric encryption key, the method further comprising:
    after decrypting the second portion using the asymmetric key, storing the extracted symmetric encryption key in the first device; and
    after receiving the session key, encrypting, by the first device, the session key using the stored symmetric encryption key, wherein transmitting the session key comprises transmitting the encrypted session key.

13. The method of claim 12, further comprising:
    receiving, by the first device, a public key corresponding to a private key, wherein decrypting the second portion comprises using the received public key.

14. The method of claim 10, wherein verifying the digital certificate comprises comparing the first portion with the second portion.

15. The method of claim 1, wherein receiving the digital certificate by the first device comprises receiving the digital certificate from the second device.

16. The method of claim 1, wherein receiving the session key by the first device comprises receiving the session key from a third device.

17. The method of claim 1, wherein receiving the session key comprises receiving the session key encrypted by symmetric encryption, and wherein transmitting the session key comprises forwarding the encrypted session key.

18. A network device comprising:
    a transceiver; and
    a processor configured to:
        receive a digital certificate, the digital certificate includes an authentication credential associated with a first device;
        verify the digital certificate using asymmetric key cryptography;
        in response to the verifying, transmit the authentication;
        after transmitting the authentication credential, receive a session key associated with the first device; and
        transmit the session key using symmetric key cryptography.

19. The network device of claim 18, wherein the digital certificate comprises a symmetric encryption key, wherein the processor is configured to encrypt the session key with the symmetric encryption key to produce an encrypted session key, and wherein transmitting the session key using symmetric key cryptography comprises transmitting the encrypted session key.

20. The network device of claim 19, wherein the processor is configured to receive with the digital certificate a nonce.

21. The network device of claim 20, wherein:
    the nonce comprises a pseudo-random number.

22. The network device of claim 20, wherein the processor is configured to, in response to verifying the digital certificate, store the symmetric encryption key and the nonce.

23. The network device of claim 18, wherein verifying the digital certificate comprises comparing a first portion of the digital certificate with a second portion of the digital certificate using a hash of the first portion.

* * * * *